July 2, 1929.　　　C. SCHLUMBERGER　　　1,719,786
METHOD FOR THE LOCATION OF OIL BEARING FORMATION
Filed Aug. 18, 1926
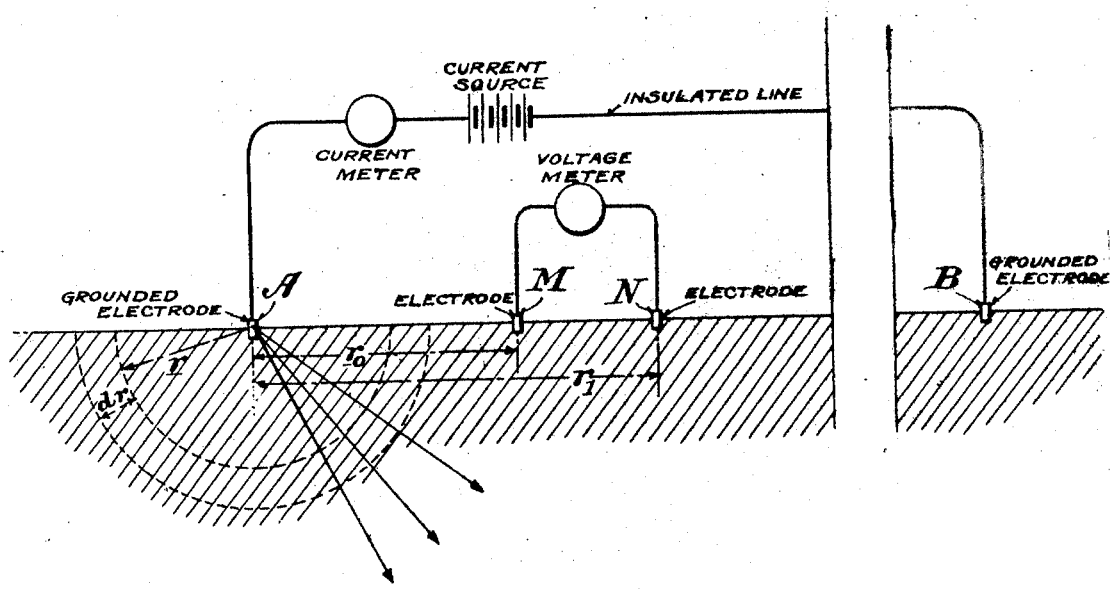

Patented July 2, 1929.

1,719,786

UNITED STATES PATENT OFFICE.

CONRAD SCHLUMBERGER, OF PARIS, FRANCE.

METHOD FOR THE LOCATION OF OIL-BEARING FORMATION.

Application filed August 18, 1926, Serial No. 130,107, and in France September 15, 1925.

It has been found that the oil bearing formations show in the majority of cases a high degree of salinity, and that the oil occurs near the places where the salinity is the highest.

The salinity referred to is approximatively the total weight of sodium chloride dissolved in the unit volume of rock. The dissolved salts such as calcium sulfate for example, add their effect, according to their electro-chemical equivalent and their degree of ionization, but generally they do not interfere very much with the salinity of oil bearing formations. The salinity is not limited only to the aquiferous beds where circulates the brine well known in oil wells. It impregnates the whole rock, owing to the latter's contained water. The fact is especially marked in the impervious clays and marls.

The specific electrical conductivity of the rocks is practically proportional to their salinity and the zones where this salinity is maximum corresponds to the points where the conductivity of the soil is the greatest. It should be noted that the undissolved crystallized salts, such as rock salt, gypsum, or anhydrite, do not interfere in an increase of the electrical conductivity. They are insulators. They have no action unless they are in sufficient quantity to constitute by their volume one of the essential elements of the rock.

The process which is the object of this invention, consists in looking for oil fields by measuring the electrical conductivity of the ground and by deducing from the observations gathered in this way, the areas or zones of maximum salinity, and, consequently, the areas or zones where are to be found the oil and accompanying gas. The process is realized in practice by taking a methodical series of measurements of the specific electrical conductivity of the soil, in a series of locations chosen on the surface of the ground, then by comparing with one another the obtained results, so as to determine the zones of maximum conductivity which correspond to the oil bearing area.

The electrical method to adopt for the measurements of the soil's electrical conductivity should give the value of this parameter at different depths from the surface. It should enable one to eliminate the influence of the superficial stratas whose electrical properties generally do not correspond at all to those of the deeper seated strata, the only one which may contain liquid or gaseous hydrocarbons.

Any method complying with this condition may be applied. It may be based upon the use of direct or alternative current sent directly in the soil between two "grounds", as is explained hereinafter, with measurements of the intensity of the current and the difference of potential produced by "ohmic" effect in the soil. It may also consist of an induction method using an inducing current of high frequence.

The method corresponding to the former of these two cases is detailed in the following nonlimitative example:

Between two points of the soil A and B, a direct or alternating current is sent in the earth by the means of an insulated line ending in two "grounds", and containing a source of electricity.

If the soil is homogeneous its conductivity $\lambda$ is given by the following formula which is deduced from the Ohm's law:

$$(1) \quad \lambda = \frac{i}{r\pi\Delta v}\left(\frac{1}{r_0} - \frac{1}{r_1} - \frac{1}{r'_0} + \frac{1}{r'_1}\right)$$

In this formula, $i$ stands for the magnitude of the electric current flowing in the insulated line and through the earth between the points A and B as measured with any suitable current meter, $\Delta v$ for the difference of potential produced by the current between any two points of the soil M and N, $r_0$ and $r_1$ the respective distance of each of these two points from the "ground" A, $r'_0$ and $r'_1$ their distance from the "ground" B.

In further explanation of the above formula I refer to the accompanying diagram and will consider the case of a current flowing in a homogeneous soil from any terminal A, towards another terminal B located at a great distance from A. The threads of current passing out from A may be regarded, for the sake of symmetry, as cones of which terminal A is the apex, and the equipotential surfaces as hemispheres, of which A is the center. Two of these hemispheres are indicated in the diagram, their radii being $r$ and $r+dr$. Applying Ohm's law for obtaining the potential difference between the two hemispherical surfaces in terms of conductivity:

$$dv = \frac{i}{\lambda}\left(\frac{dr}{2\pi r^2}\right)$$

Calculating for the two points $M_0$ and $M_1$, the integrant between the limits $r_0$ and $r_1$, that is between two hemispheres whose radii are $r_0$ and $r_1$ (see diagram), gives—

$$(2) \quad \Delta v = \frac{i}{2\pi\lambda}\left(\frac{1}{r_0} - \frac{1}{r_1}\right)$$

Thus knowing $\Delta v$, $r_0$ and $r_1$, the value of $\lambda$ (conductivity) may be determined.

In order to take into consideration the influence of the second terminal B, whereas in practice the terminal B cannot be at an extremely remote point, it is sufficient to add algebraically its effect to that of A according to the classic principle of the addition of potentials and of the superposition of equilibrium states. The action of B in creating a potential difference between the points M and N spaced at distances $r'_0$ and $r'_1$ from B is:

$$(3) \quad dv' = \frac{-i}{2\pi\lambda}\left(\frac{1}{r'_0} - \frac{1}{r'_1}\right)$$

In this equation it is necessary to indicate the current intensity with a minus sign $(-i)$ because now the current is brought out of the soil to B and the ohmic effect is in the reverse direction.

Adding (2) and (3) to obtain the simultaneous effects of A and B the total potential difference is:

$$(4) \quad \Delta V = \frac{i}{2\pi\lambda}\left(\frac{1}{r_0} - \frac{1}{r_1} - \frac{1}{r'_0} + \frac{1}{r'_1}\right)$$

This may be transferred into equation (1) giving the formula for conductivity ($\lambda$) in terms of the known values.

Thus the conductivity is obtained by the measurement of an intensity, of a difference of potential and of four distances.

It is generally advisable to place on the insulated line carrying the current a standard resistance of a known value R.

Then: $\Delta v' = Ri$ $\Delta v'$ standing for the ohmic drop of potential between the two terminals of the standard resistance. The formula for the conductivity then becomes:

$$\lambda = \frac{1}{r\pi R} \cdot \frac{\Delta v'}{\Delta v}\left(\frac{1}{r_0} - \frac{1}{r_1} - \frac{1}{r'_0} + \frac{1}{r'_1}\right)$$

It will be seen that under these conditions, the actual electrical operations now only consist in the measurement of ratio $\frac{\Delta v'}{\Delta v}$ which can be made with arbitrary units of potential.

If the ground which is supposed to be homogeneous throughout its depth is covered by an overburden of a different nature, such as is frequently the case, the formula given above is still good, provided, that the base AB is large with respect to the thickness of the overburden, and that the points M and N are not placed close to A or B.

In these conditions the volume of coil, on which the measure is taken, is considerable. The superficial layer offers but a small section to the lines of current which penetrate deep into the ground. It does not interfere appreciably in the whole flow of the current and in the distribution of potentials, hence in the result of the measurement. It will be seen that it is always necessary to adapt to the local geological conditions the dimension chosen for the measurements, since the action of the deep stratas increases, in respect to the action of the superficial layers, with the choice of greater dimensions.

Preferably the whole system is moved from one location to another without any modifications to the relative position one to the other of the points A, B, M, N, so as to keep the experimental disposition and to obtain strictly comparable results.

When the soil can not be compared a homogeneous body, even after making away with the superficial irregularities, the problem of measuring the conductivity of the ground becomes more complicated. Nevertheless the conductivity may still be calculated by making some simple hypothesis which suffice for practical applications.

The following cases are examples:

1. The soil consists of a horizontal homogeneous layer of constant thickness (overburden) covering a different substratum, homogeneous itself to a great depth.

2. The soil has a conductivity constant on the same horizontal plane but varying proportionally with the depth.

In these two cases, to obtain the conductivity at different depths, it is necessary to measure:

(a) The magnitude of the current.

(b) The difference of potential, not only between two points M and N as before, but between a number of points M, N, $N_1$, etc..... of the surface of the soil, the position of each of these points with respect to the "grounds" A and B being exactly surveyed.

What I claim is:

A method for locating oil-bearing formations by determining the areas where the electrical conductivity of the soil is greatest (which areas correspond to those of maximum salinity) said method consisting in maintaining a current (either direct or alternating) through the soil by means of a suitable circuit containing a source of electricity and electrically connected at each end to a grounded terminal, while taking measurements of the magnitude of the current in the circuit and the difference of potential between a pair of surface points, other than those of the grounded terminals, spaced apart on a radius through one of said terminals and whose relative positions with respect to said terminals are predetermined constants, and lastly computing from the above data the specific conductivity of the layers of soil at different depths.

In testimony whereof I have affixed my signature.

CONRAD SCHLUMBERGER.